Figure 1:
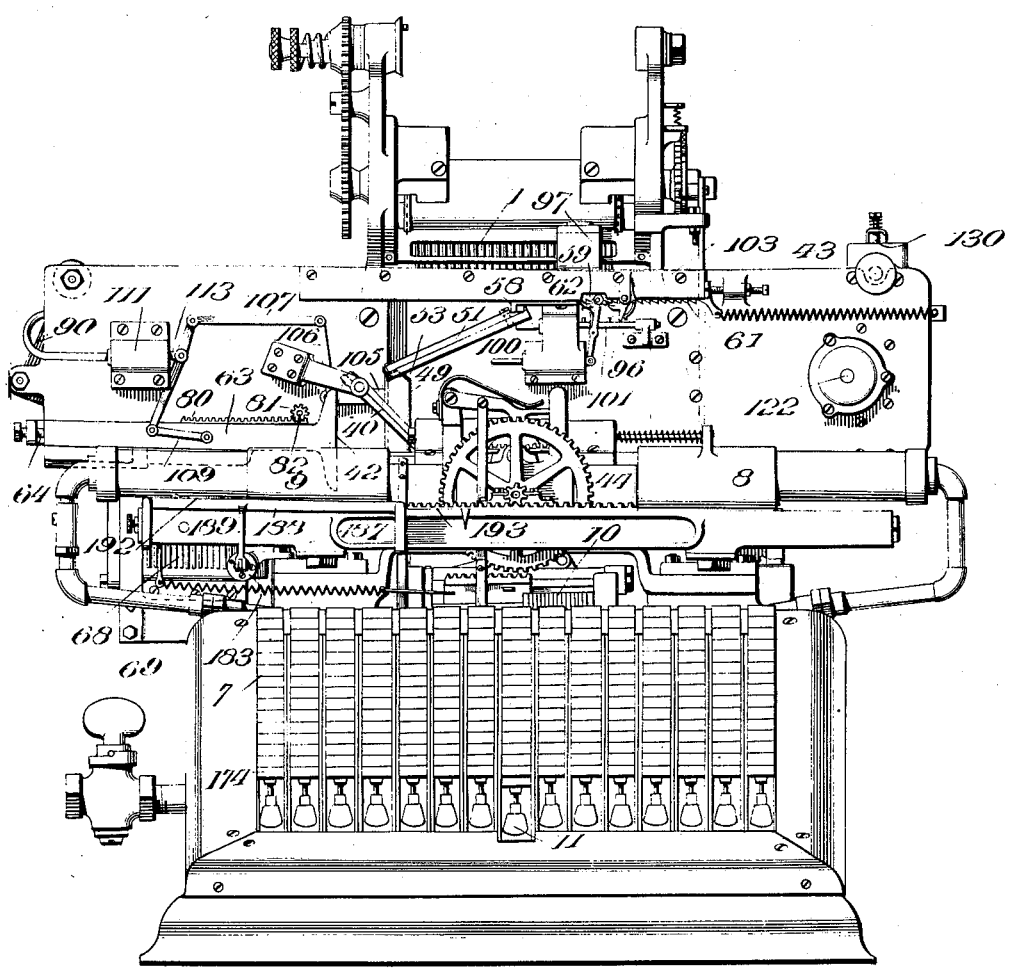

J. B. CHURCH.
CONTROLLER COMPOSING MACHINE.
APPLICATION FILED OCT. 22, 1902. RENEWED OCT. 14, 1903.

915,553.

Patented Mar. 16, 1909.
11 SHEETS—SHEET 1.

J. B. CHURCH.
CONTROLLER COMPOSING MACHINE.
APPLICATION FILED OCT. 22, 1902. RENEWED OCT. 14, 1903.
915,553.
Patented Mar. 16, 1909.
11 SHEETS—SHEET 2.
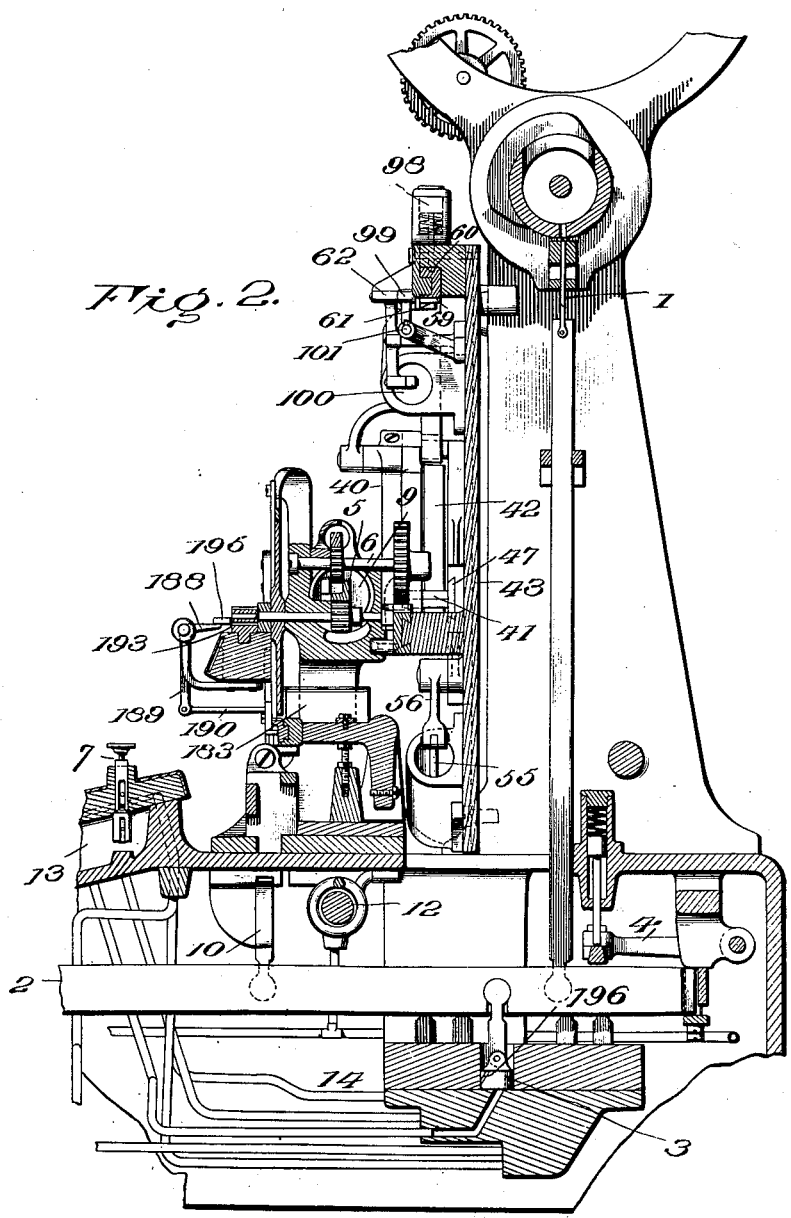

J. B. CHURCH.
CONTROLLER COMPOSING MACHINE.
APPLICATION FILED OCT. 22, 1902. RENEWED OCT. 14, 1903.
915,553.
Patented Mar. 16, 1909.
11 SHEETS—SHEET 3.
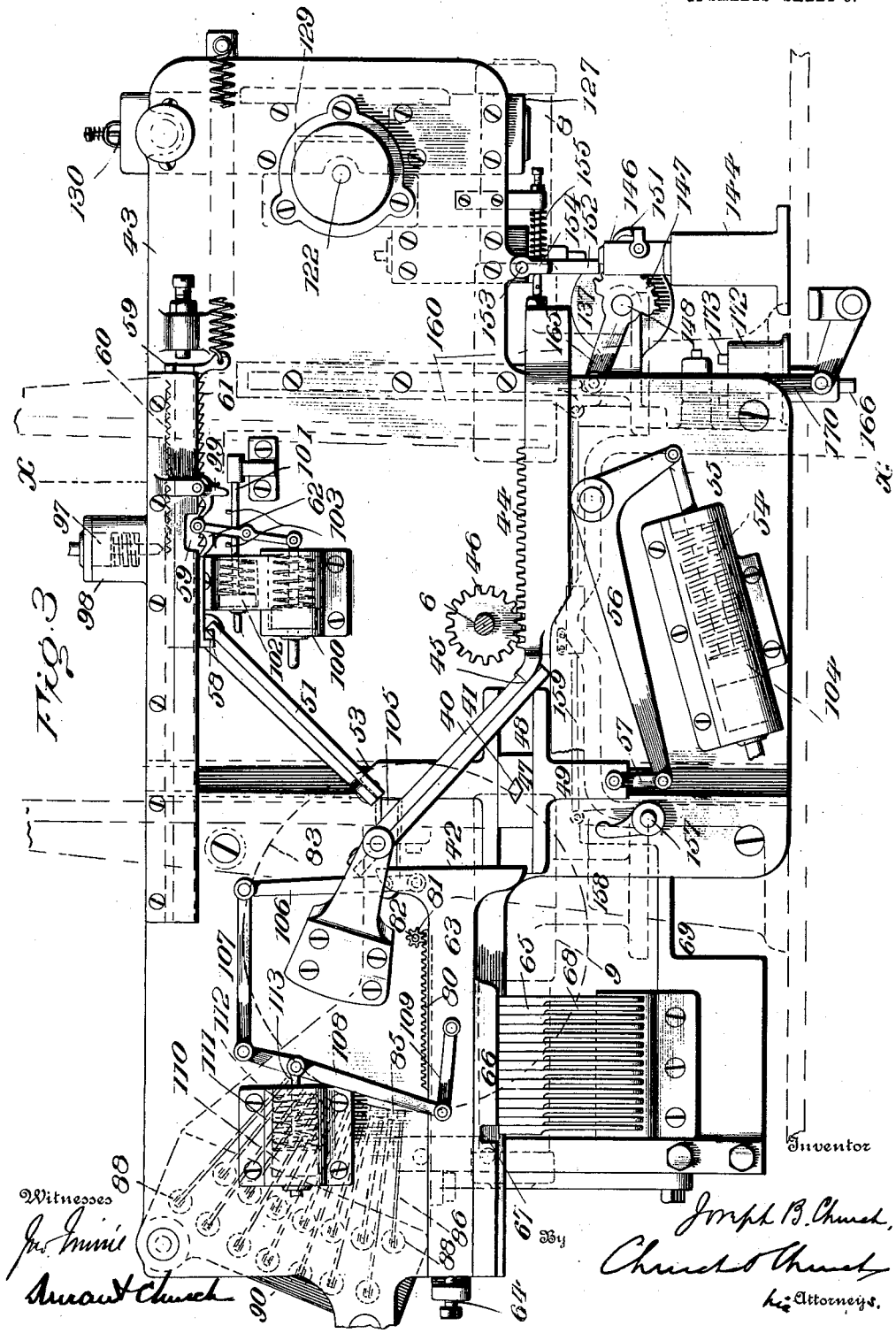

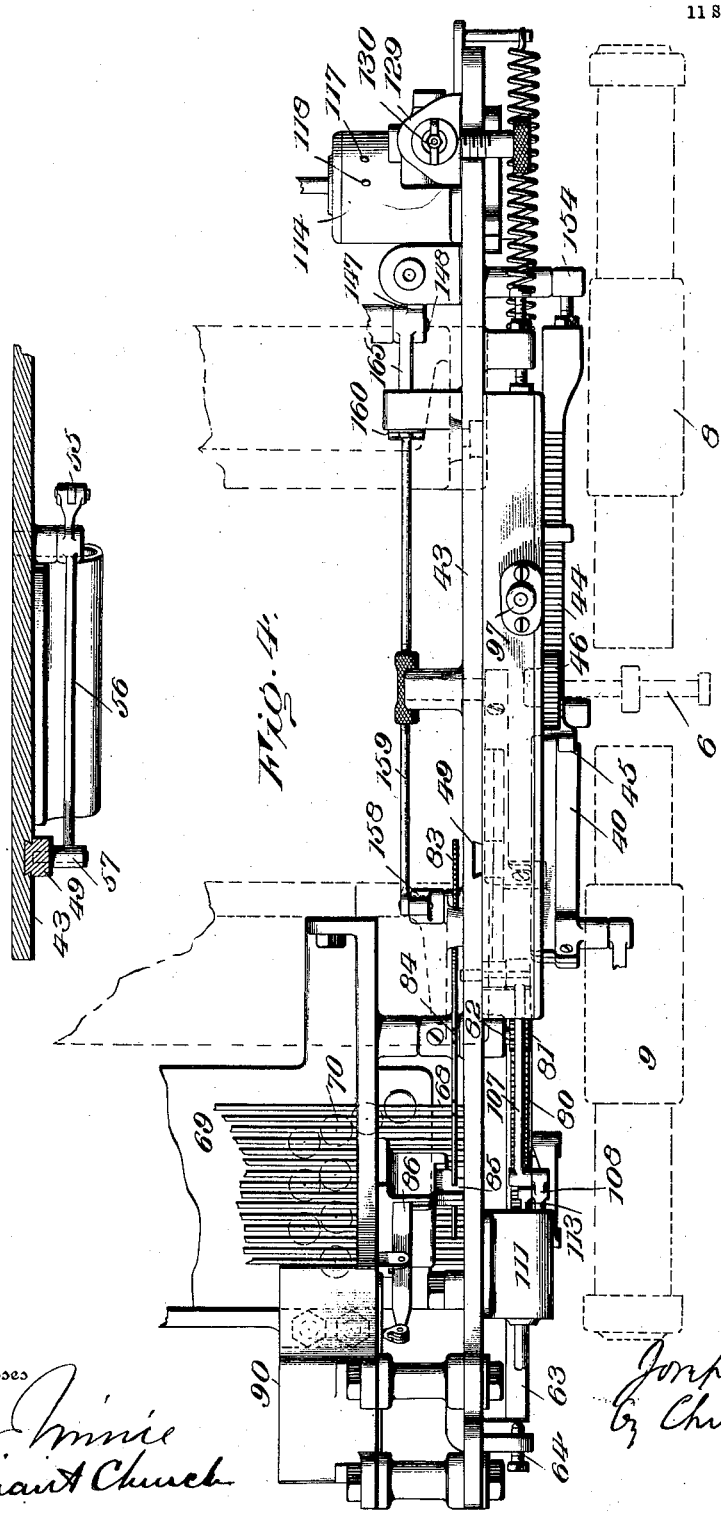

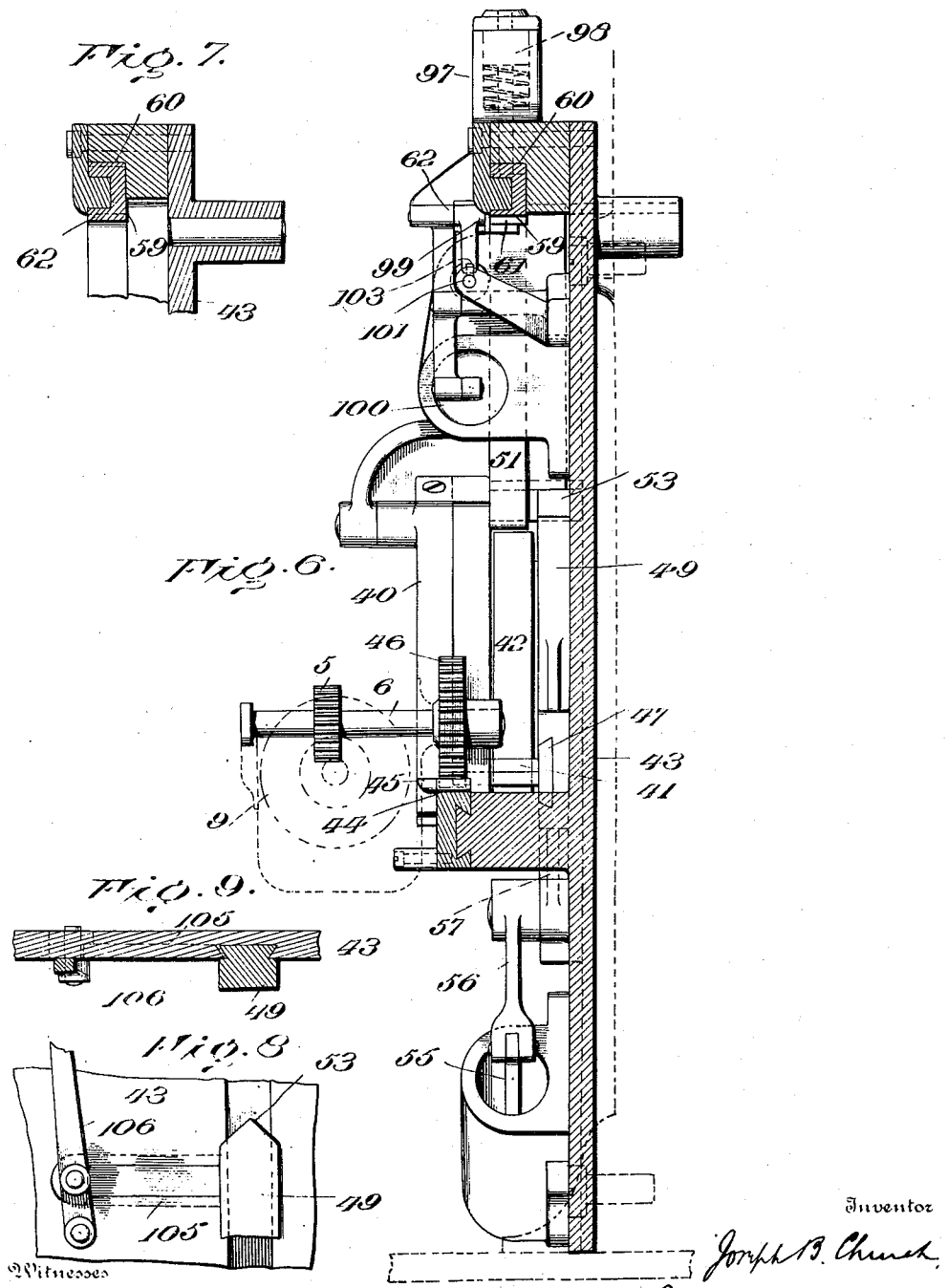

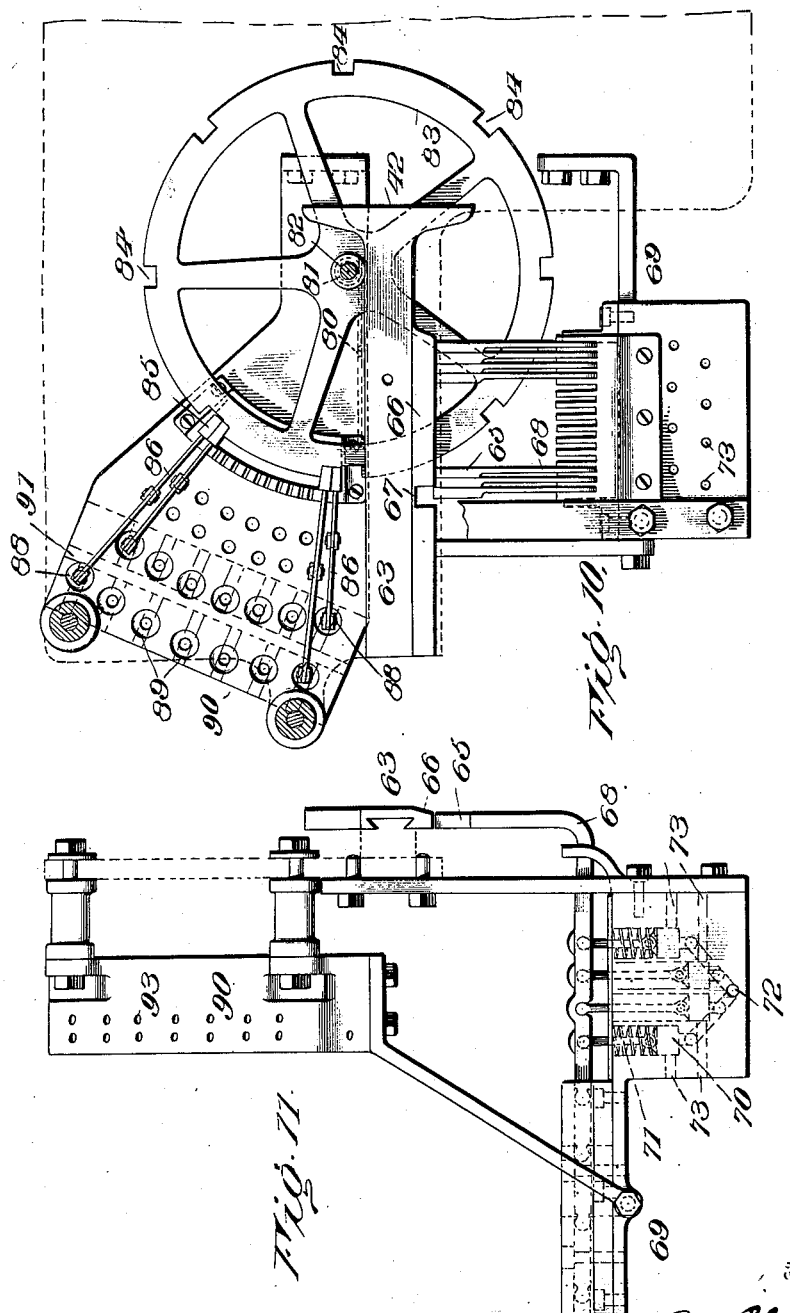

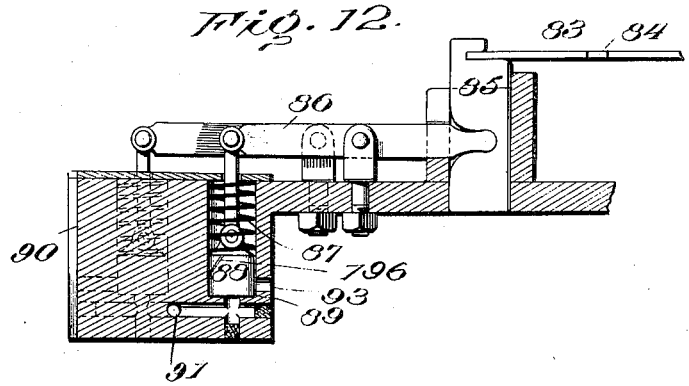
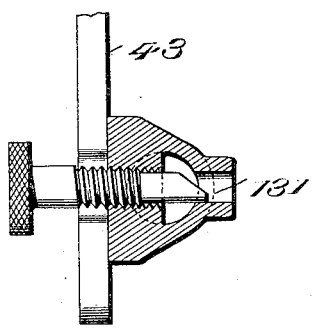
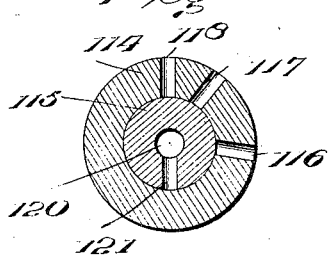
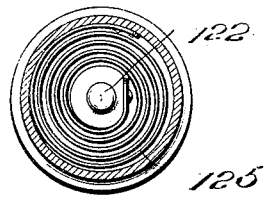
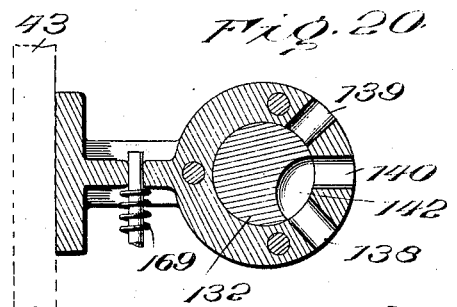

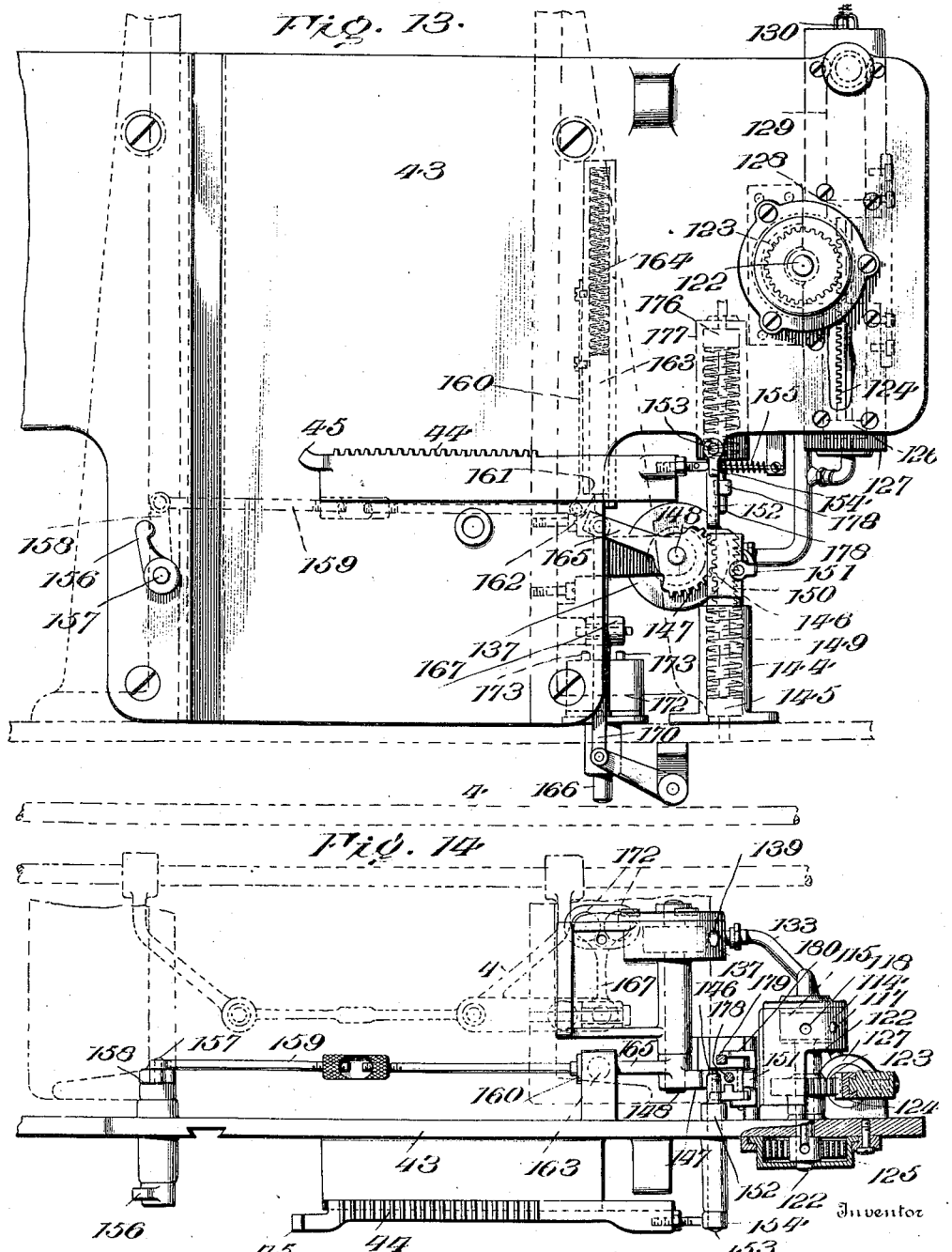

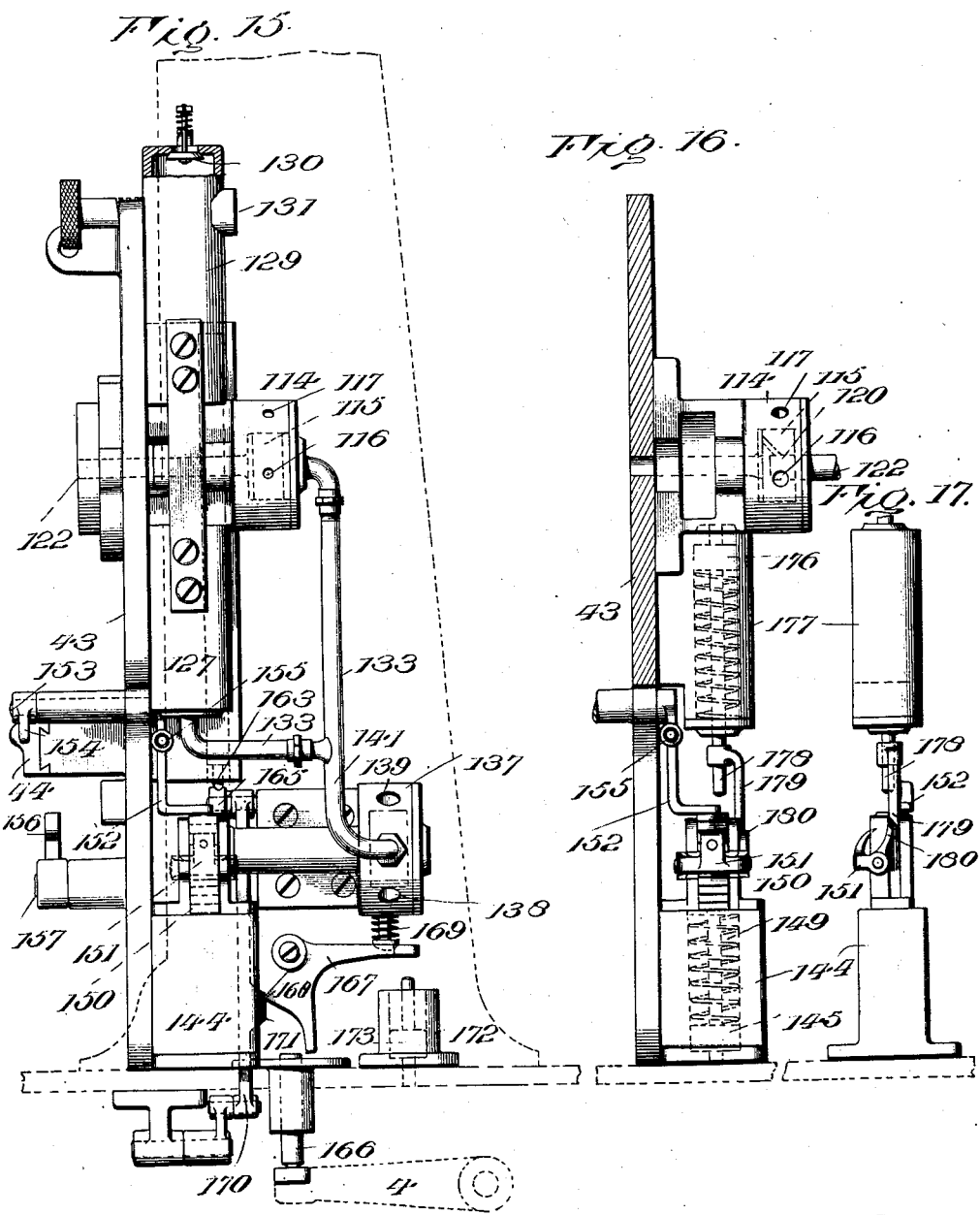

J. B. CHURCH.
CONTROLLER COMPOSING MACHINE.
APPLICATION FILED OCT. 22, 1902. RENEWED OCT. 14, 1903.
915,553.
Patented Mar. 16, 1909.
11 SHEETS—SHEET 10.
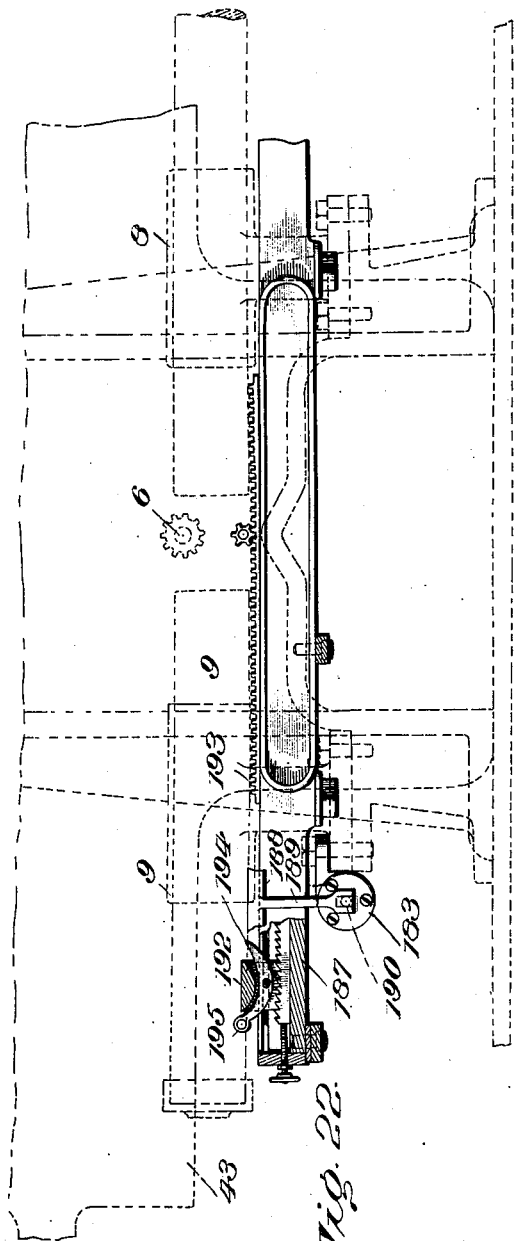
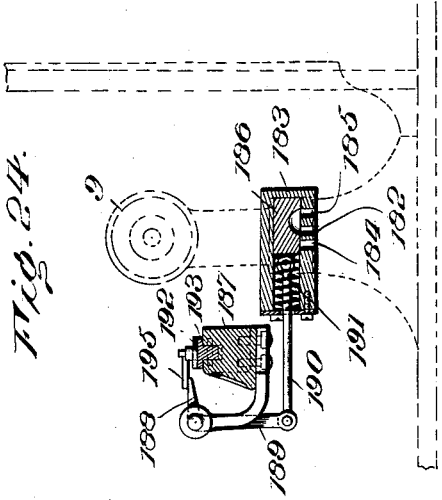
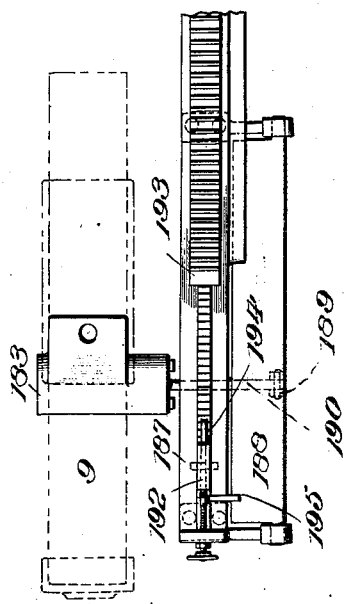

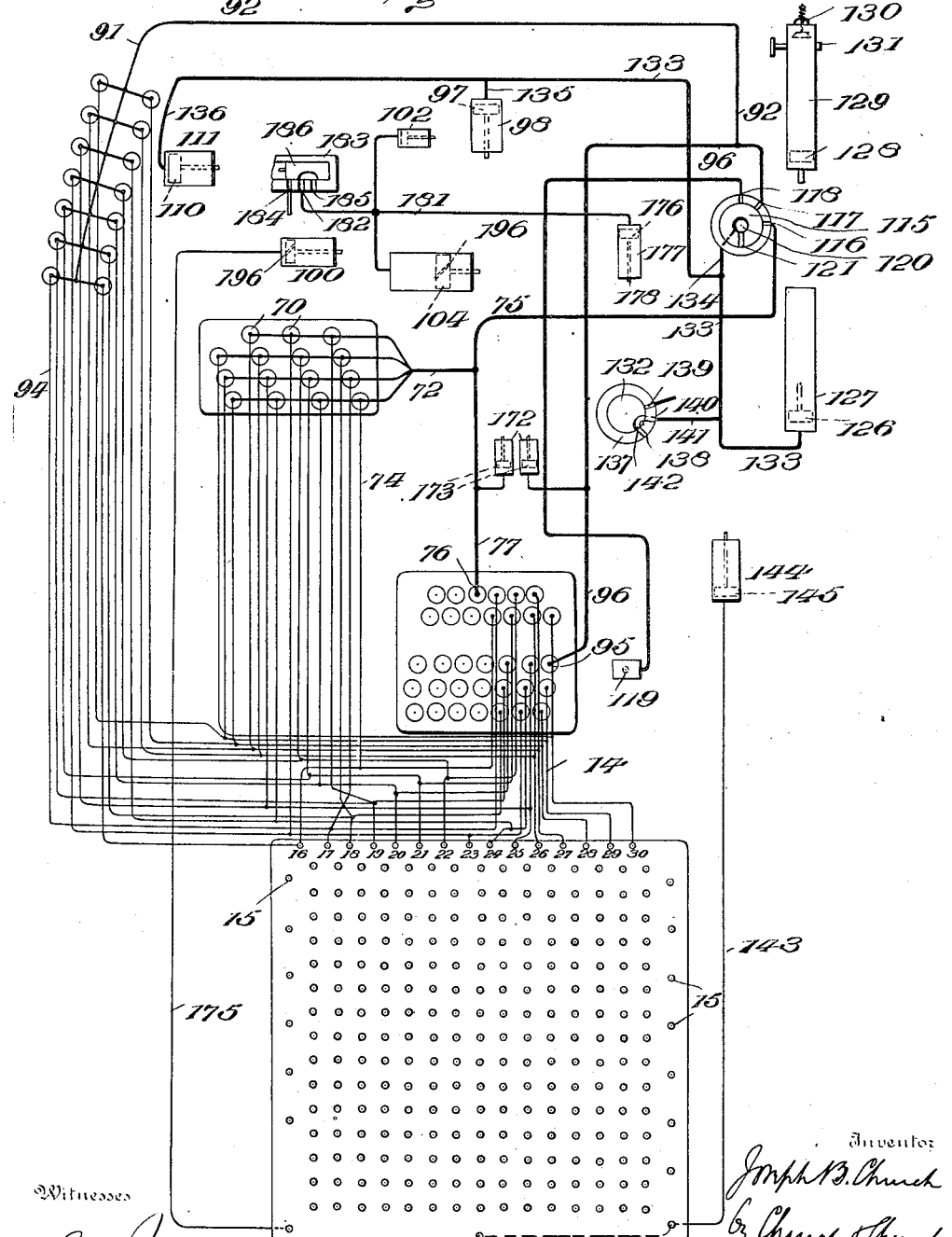

UNITED STATES PATENT OFFICE.

JOSEPH B. CHURCH, OF WASHINGTON, DISTRICT OF COLUMBIA, ASSIGNOR TO LANSTON MONOTYPE MACHINE COMPANY, OF NEW YORK, N. Y., A CORPORATION OF VIRGINIA.

CONTROLLER COMPOSING-MACHINE.

No. 915,553.     Specification of Letters Patent.     Patented March 16, 1909.

Application filed October 22, 1902, Serial No. 128,312. Renewed October 14, 1903. Serial No. 177,077.

*To all whom it may concern:*

Be it known that I, JOSEPH B. CHURCH, of Washington, District of Columbia, have invented certain new and useful Improvements in Controller Composing-Machines; and I do hereby declare the following to be a full, clear, and exact description of the same, reference being had to the accompanying drawings, forming a part of this specification, and to the figures and letters of reference marked thereon.

This invention relates to the class of composing machines in which the characters, spaces, justification, etc. are represented by signals set up or produced in a controller, the latter constituting the governing element of an automatic typographic machine, such as type and matrix making, type setting, typewriting, linotype and other machines, and for purposes of illustration and explanation it is herein shown as applied to the controller or record strip composing machine of Patent No. 654,115. In this example the controller takes the form of a perforated strip of paper or other material, the perforations constituting signals through the medium of which automatic mechanisms are governed. Each complete signal includes one or more perforations and represents a type, both as to character and dimension, and with each series of signals representing a line of composition is associated one or more special signals representing justification, that is, the amount of space to be added to the normal or assigned value of certain type, such as spaces, in order to absorb the ascertained shortage or deficiency which would exist in the line if type of normal or standard dimensions were employed.

In the machine of the patent mentioned composition is effected through the medium of a series of keys, one for each character, space and justification fraction, said keys controlling a series of punches, for producing the signals, and a measuring and indicating mechanism for designating the justification keys appropriate to the line. Composition is effected by actuating the keys until all the matter that can properly be included in a line of predetermined dimensions has been set up, whereupon, if the line is not exactly filled, the operator, observing the indicator, strikes the justification keys or key designated thereon and in the order given to thereby produce the justification signal or signals appropriate to that line.

In the example illustrated two sets of justification signals are employed to control different adjusting mechanisms, each set being represented by its own series of keys, the latter designating different degrees of variation as applied to its particular mechanism. As the product of the composing machine constitutes the governing element of the typographic machine it is obvious that all errors in composing the controller will be reproduced at said machine. Typographical errors cannot of course be automatically detected, but those resulting in faulty justification can, as, for example, in the type casting and setting machine of Patent No. 625,998, wherein provision is made for stopping the machine automatically whenever a short or long line is presented. But such stoppages are undesirable, as involving loss of time and a proportionate reduction in the producing capacity of the machine; moreover much time is wasted at the composing machine in reading the indications and selecting the designated justification keys.

The errors referred to as resulting from faulty justification originate with the operator at the composing machine and may usually be traced to one or more of the following sources: (1) omission of justification signals where required; (2) the production of erroneous justification signals; (3) interrupting the line before the justification area is reached or the signals pertaining thereto become effective; and (4) continuing composition beyond the justification area. Whenever either of the foregoing events happens the line as produced by the controller will be abnormal, that is, either too long or too short.

Now this invention has for its principal objects the elimination of these sources of error, and, incidentally, to materially increase the output both at the composing and at the casting or other typographic machine.

To this end the invention consists, first, in the employment of a proportional divider mechanism or system for automatically selecting the justification signals appropriate to the line and forming connections for producing said signals; second, means for automatically producing the justification signals so designated, by the act of resetting the composing machine for a new line, to insure the formation of proper justification signals at the termination of each line of composition; third, means for automatically producing the designated justification signals when the line is filled, to prevent overrunning and the consequent long lines; fourth, an automatic cut out, to prevent the terminating of a line of composition before the justification area is reached, thereby avoiding short lines; fifth, a lock-out for the character signal devices brought into action while the justification signals are being produced, and operating to prevent the formation of character signals until justification has been completed and the machine reset for a new line; and, sixth, numerous novel arrangements and combinations of parts and elements incident to or embodied in the complete organization, all as hereinafter fully described and pointed out in the claims.

In the accompanying drawings illustrating the preferred form of embodiment of the said invention—Figure 1 is a front elevation of a keyboard perforating machine with the improved automatic justification control mechanism applied thereto in the form of an attachment. Fig. 2 is a vertical section. Fig. 3 is a front elevation of the proportional divider system and connections detached from the principal perforating mechanism. Fig. 4 is a top plan view of said detached system. Fig. 5 is a top plan view of the divisor actuating devices. Fig. 6 is a vertical section on line $x-x$, Fig. 3. Fig. 7 is a detail view partly in section showing the pivot of the dividend element and manner of supporting its controlling device. Fig. 8 is a detail view of the divisor brake and Fig. 9 is a sectional view thereof. Fig. 10 is a front elevation of the interponent system intermediate the dividend element and the justification punches for controlling the selection of the letter. Fig. 11 is an end view of the interponent system. Fig. 12 is a sectional view of one of the valve controllers of the interponent system. Fig. 13 is a front elevation. Fig. 14 is a top plan view partly in section and Fig. 15 is an end elevation of the automatic control mechanism for establishing connection between the divider system and the interponent system. Fig. 16 is an end view and Fig. 17 a rear elevation of the starting devices for the automatic control system and the resetting devices. Fig. 18 is a detail view of the throttled discharge for the air check. Fig. 19 is a section through the control valve. Fig. 20 is a section through the starting or actuator valve. Fig. 21 is a section through the spring box. Fig. 22 is a front elevation. Fig. 23 is a top plan view, and Fig 24 a vertical section of the automatic resetting or release mechanism. Fig. 25 is a diagrammatic view representing the lines of connection and control between the several members of the complete system.

Similar characters in the several figures indicate like parts.

The controller or record-strip perforating mechanism illustrated in Figs. 1 and 2 is that of Patent No. 654,115, but modified in the following particulars, viz: the two rows of justification keys and the justification indicator are omitted, and the connection between the resetting key and resetting valve is broken, as well as those between the justification-wedge designating punches and the keys.

For purposes of identification the following designation of some of the principal elements will suffice. 1, the series of punches; 2, the punch levers; 3, punch pistons; 4 rocking frame for actuating paper feed; 5 units motor rack of the line measuring devices; 6, shaft which formerly rotated the justification indicator; 7, valved finger keys controlling the two groups of the punches, one for designating column and the other row or position in column; 8 motor cylinder for advancing rack 5; 9, motor return cylinder for retracting rack 5; 10 measuring stops; 11 resetting key; 12 rock shaft controlling inlet and exhaust in cylinders 8 and 9; 13, pressure chamber; and 14 pipes connecting the punch cylinders with ducts controlled by key valves.

The keys are arranged in rows and columns, those of each row controlling the admission of pressure to a duct common to that row, and those of each column controlling a duct common to the keys of that column. In the diagrammatic view Fig. 25, the ducts representing rows of keys are numbered 15 (connections to punches omitted) while those representing columns of keys are numbered 16 to 30 inclusive. The punches and their actuating devices comprise three series or groups, one connected to the row ducts 15 and each responding to a row of keys; another connected to the column ducts 16—29 and each responding to a column of keys; and a third group pertaining to the justification wedge selecting punches.

The advance of the line measuring devices, represented by rack 5, under pressure in cylinder 8 is measured and controlled by an escapement mechanism including measuring stops 10 carried by the punch levers connected to the column ducts 16—29. Thus when any key is depressed it not only actuates the punches for producing the row and column signals but, through the column punch lever, it advances the line measuring devices a distance proportional to the unit value of the column in which the key is located. In this machine the line measuring mechanism operates by subtraction, the line or units motor rack being set initially to represent the full length of line, and the unit value of each type is subtracted therefrom when the signal is produced. As the unit motor rack approaches the end of the line and enters the justification area it operates through a pick-up to communicate its motion to shaft 6.

It may be here remarked that the piston connected to the right hand column duct 30 is unprovided with a punch, and that the duct 15 for the lower row of keys is omitted, the absence of column or row signals in the controller effecting a maximum movement of the die-case in the casting machine, hence signals for those extreme adjustments are or may be omitted. It may be further noted that the column punches, represented by the series of column ducts 16—29, when associated with one of the justification-wedge designating punches are utilized in producing the justification signals, the designating punches for selecting the wedge to be adjusted, and punches 16—29 the degree of adjustment.

Heretofore the appropriate justification fractions were indicated, visually, to the operator who was required to translate the indications into signals by the selection and actuation of the designated keys, and it is one of the principal objects of the present invention to render this selection of keys, or what is the same thing, of the punches controlled thereby, automatic and entirely independent of the operator. To this end a novel proportional divider system has been devised for dividing the space remaining to be filled by justification by the number of justifying space type occurring in the line, the fraction thus obtained forming the measure for controlling a selecting or interponent system in designating justification signals appropriate to the line. The proportional divider system involves as its distinguishing feature a right angle triangle of which at least two sides are variable, the one proportionally to the space to be filled, and the other to the number of space type among which distribution is to be made. The three sides of the triangle involved in this proportional divider system are herein designated as the dividend, divisor and quotient elements, of which the dividend element measures the space to be filled and is represented by pivoted bar 40, Fig. 3; the divisor denoting the number of divisions or space type to be widened is represented by double knife edge 41 supported to reciprocate perpendicular to the base on a line intersecting the axis of the hypotenuse bar 40; and the quotient, which indicates the division effected and controls the selector or interponent system is represented by a straight edge 42 supported to reciprocate in a right line intersecting the perpendicular and hypotenuse. Although in the example given the hypotenuse of the triangle is assigned to the dividend, the perpendicular to the divisor, and the base to the quotient elements, it is obvious that these assignments may be transposed if desired and either side of the triangle made to perform the correlative offices of measuring the space to be justified, dividing said space, and indicating the fractional result.

Inasmuch as the present improvement is designed as an attachment to an existing form of perforating machine, the frame or plate 43 serving as a support therefor is detachably secured to the uprights carrying the paper feed and punches, said plate being located just in rear of the supports for cylinders 8 and 9.

The pivoted hypotenuse bar or dividend 40 is furnished with two straight edges or surfaces in the same plane, parallel with its center of motion and radial thereto. A rack bar 44 supported to reciprocate in guides parallel with the base line of the triangle is provided with a knife edge 45 engaging one of the straight edges of bar 40 and operates to vary the angle of said bar proportionally to the advance of the line measuring devices within the justification area. To this end said rack-bar 44 is engaged by a pinion 46 fast on shaft 6.

The divisor or double knife edge 41 is carried by a block 47 supported to reciprocate in two planes at right angles, the one parallel with the path of rack-bar 44 and the other perpendicular thereto, to which end said block 47 is mounted in guides on a cross head 48 carried by a slide 49, the latter moving in guides on plate 43 perpendicular to the guides for rack-bar 44. One edge of the double knife edge 41 is located in the plane of movement of one of the radial straight edges of the dividend element or bar 40, while the opposite edge is in the plane of the quotient element or straight edge 42 so that the permissible movement of said double knife-edge in a line parallel with the base of the triangle equals at all times the length of said base line as determined by the adjustment of slide 49. When in normal or zero position the line of motion of knife edge 41 in a horizontal direction coincides with the base of a right angle triangle whose perpendicular and hypotenuse are defined by straight edge 42 and bar 40 respectively, said base line constituting a gage of the measured deficiency of the line as determined by the angular position of bar 40. As the bases of similar right angle triangles vary in direct proportion to their perpendiculars, it is obvious that by shifting the position of knife edge 41 longitudinally of the perpendicular the length of its path, coinciding with the base line of the new triangle thus established, may be increased or diminished in any proportion as compared with the normal base or indicated deficiency of the line. Hence in effecting a division of the deficiency in the line by the number of space type contained therein the line of travel of knife edge 41 is shifted, through the medium of its supporting slide 49, so that it will intersect the perpendicular of the normal or basic triangle at ½ its length, measured from the apex, for two spaces, ⅓ of its length for three spaces, ¼ its length for four spaces and so on.

The mechanism for effecting the proportional movements of slide 49 is believed to be novel, and includes a radius bar 51 provided with two straight surfaces in a plane parallel with and radial to the axis of said bar. One straight surface is engaged by a knife edge 53 carried by slide 49 and held in contact therewith by a spring 54 acting through a rod 55, lever 56 and link 57. The opposite straight surface contacts with a knife edge 58 mounted upon a bar 59 which is guided on plate 43 to move in a plane perpendicular to slide 49. The bar 59 is provided with locking and positioning V-shaped depressions 60 and ratchet teeth 61, the latter engaged by a feeding pawl 62 deriving motion from the justification space key, as hereinafter explained. The knife edge 58 is located to one side of or below the axis of bar 51 a distance equal to the interval between successive ratchet teeth 61. The straight radial face of bar 51 engaged by said knife edge 58 is cut away near the axis of the bar, as seen in Fig. 3, to permit the knife edge to pass to one side of the radial line formed thereby, thus forming a lock for said bar 51 when in initial position, and permitting one advance movement of the bar 59 without a corresponding movement of radius bar 51. This is to permit at least one justifying space to be included without disturbing the relation of the divider element so that the maximum justification will be effective. The first movement of knife edge 58 will carry it into the plane of the radius surface on bar 51, as seen in Fig. 3, without, however, permitting bar 51 to turn on its axis. The next succeeding advance will result in a movement of bar 51 equal to one half of the perpendicular of an inverted right angle triangle formed by the lines of travel of knife edges 53 and 58 and of which bar 51 constitutes the hypotenuse. The next advance of knife edge 53 will reduce the perpendicular to one third its original dimensions, the next to one fourth and so on. The divisor element 41 having thus been automatically set to correspond with the number of justifying space type or divisions to be formed, and the dividend element 40 adjusted proportionally to the amount of space remaining to be filled by justification, the proportionate amount to be assigned to each space type will be represented by the base of the right angled triangle, or the distance from the straight edge 42 standing parallel with the line of motion of double knife edge 41 to the hypotenuse, represented by bar 40, on a line at right angles to the perpendicular, and represented by the path of movement of said straight edge 42. To measure this base line it is only necessary to advance straight edge 42 and double knife edge 41 until arrested by bar 40. It may here be noted that straight edge 42 does not stand in the plane of the axis of bar 40 but in a plane parallel with the perpendicular of the triangle and separated therefrom an amount equal to the interval between the opposite engaging surfaces of double knife edge 41. This is to avoid placing said engaging surfaces in the same plane as would be necessary if straight edge 42 was in the plane of the perpendicular intersecting the axis of bar 40. The quotient element represented by straight edge 42 is carried by a slide 63 the latter guided to reciprocate on plate 43 in a path at right angles to said straight edge and parallel with bar 44. Slide 63 is held normally in retracted position against an adjustable stop 64, and when advanced the extent of its motion corresponds with the length of the base of the triangle as determined by the position of the divisor 41 and dividend 40. The movement thus permitted the quotient element represents, proportionally, the amount to be added to each justifying space type in order to fill out the line, and it is only necessary to convert this measured motion into a selective or designating action in order to indicate the appropriate justification signal producing devices. The means and method adopted for this purpose will depend largely upon the character of the machine and system to which it is applied.

The punch selecting or interponent system herein illustrated has been particularly adapted to the machine with which the present invention is associated, and is designed to deal with a duplex justification mechanism and to form separate signals of designation and position for each of said mechanisms.

The designating portion of the signal determines which of two measuring systems is to be acted upon, the one representing increments of .0075 of an inch and the other .0005 of an inch. To each system is assigned fifteen positions of adjustment represented by the punches pertaining to the column ducts 16—30, Fig. 25. Both adjusting mechanisms are at all times active in the casting machine, hence their signals of position are to be taken into account. First as to the major or .0075 unit positioning signals. The fifteen progressive stages of adjustment are represented by the punches connected to ducts 16 to 29 (Fig. 25); 16 representing the minimum, 17 the next higher by .0075 of an inch and so on through the series. The full traverse of slide 63 is just equal, proportionally, to the entire justification area, and represents the maximum amount that can be added to one type to fill the line. A different standard may be adopted, but this will suffice for illustration. The maximum throw of slide 63 is divided into fifteen equal parts, each represented by a selector 65 (Figs. 3, 10 and 11) the latter of uniform width and serially disposed parallel to one edge of a flange or plate 66 carried by said slide. The plate 66 is furnished with a gate or notch 67 the entrance to which is just wide enough to admit two selectors 65. When the quotient slide 63 is in retracted position the advanced edge of the notch just uncovers the first selector 65 and the latter remains uncovered during 1/15th of the maximum throw of slide 63, or until the rear edge of the notch advances in front of it, at which instant the second selector is uncovered, and so on through the series, the several selectors being successively uncovered and so remaining during 1/15th of the maximum throw of quotient slide 63, in the order of their progressive values. Each selector 65 is mounted upon a lever 68, pivotally supported upon a frame 69 attached to plate 43, and is connected to one of a series of pistons 70 working in cylinders formed in frame 69. Each piston is acted upon by a retracting spring 71, and the several cylinders are in open communication at the rear with a common pressure supply duct 72, Fig. 11. Thus when pressure is admitted to duct 72 all the pistons will be operated upon, but only the one connected to the selector 65 at the time wholly uncovered by notch 67 will be permitted to advance, the others being restrained by plate 66. Each cylinder is also provided with a port and passage 73 which is covered by its piston 70 when retracted, and uncovered, to admit pressure from duct 72, when the piston is permitted to make its full stroke. Each port 73 is connected by one of a series of pipes 74, Fig. 25, to one of the measuring punch cylinders, or what is the same thing to one of the conduits leading from the column ducts 16—30 to said cylinders; that is to say, the port 73 of the piston 70 pertaining to the first of the series of selectors 65 is connected to duct 16, the second, to duct 17, the third to duct 18, and so on through the series. It will be seen, therefore, that when the quotient slide 63 is arrested within any one of the fifteen degrees into which its motion is divided, the selector 65 corresponding therewith will alone be in condition to advance, and when pressure is admitted to duct 72, by a key or otherwise, the designated selector will be advanced, port 73 uncovered and pressure admitted to actuate the piston of the positioning punch corresponding in value with said selector. In order that the designating perforation for the .0075 justification signal or perforation, may be produced simultaneously with the positioning perforation it is only necessary that the pressure supply conduit 75 leading to duct 72 should be placed in communication with the cylinder 76 of the .0075 designating punch, as by a branch pipe 77, Fig. 25. Next as to the minor or .0005 justification designating and positioning signals. Each major justification adjustment is associated with a minor adjustment representing one of fifteen progressive stages with a uniform increment of .0005 inch; otherwise, stated, the signal is formed by a designating punch and one of the fourteen punches controlled by the column ducts 16—29, the selection depending upon the amount to be added to each justification space type over and above that designated by the major justification signal. The purpose of this is to secure a smaller unit with a limited range of adjustment. To effect this each of the fifteen degrees of movement of the quotient slide 63 is subdivided again into fifteen degrees, and the positioning signals appropriate thereto selected. The quotient slide 63 is provided with a rack 80 engaging a pinion 81 fast on shaft 82, the latter carrying a disk 83 (Fig 10). This disk is provided with a series of equally spaced peripheral notches 84, and the gearing is so proportioned that for each degree of movement of the quotient slide the disk will traverse an arc equal to the distance between contiguous notches. A series of fourteen selectors 85 coöperate with this disk, each representing 1/15 of the interval between the centers of adjacent notches 84. The fifteenth selector has been omitted as no perforation is required for the fifteenth degree of adjustment, hence the designating perforation alone, represents the fifteenth degree of adjustment. The selectors 85 are all of exactly the same width and the notches 84 are each of a width of two selectors, to insure the entrance of at least one selector. Should two enter, the lower value would alone be counted.

Each selector 85 is carried by a pivoted lever 86 provided with a retracting spring 87 (Fig. 12) and a piston 88, the latter working in one of a series of cylinders 89 formed in a block 90, secured to the rear of plate 43. The rear ends of the cylinders open into a duct 91 connected through pipe 92 to a pressure supply, and each cylinder is provided with a port 93 which is closed by the piston when retracted and opened when the piston advances. The port 93 of each cylinder is in open communication through one of a series of conduits 94 (Fig. 25) with the cylinder of one of the positioning punches, that is to say, with a punch connected to one of the series of column ducts 16—30, the cylinder of the foremost selector in the direction of rotation of disk 83, being connected to column duct 16, the second to column duct 17, and so on. With the quotient slide in initial position i. e., retracted, the front edge of notch 84 just clears the first selector 85 and the latter is free to enter. No other selector can advance until the front wall of the notch clears the second selector and at the same time interposes the rear wall in the path of the first, and so on in progression, each selector in succession being alternately released and locked out. It is only while the rear wall of the notch is traversing in front of the last or fourteenth selector, and before the first selector is uncovered by the next succeeding notch, that all the selectors are locked out, this interval representing the fifteenth place of adjustment when no positioning perforation is required. The cylinder 95 (Fig. 25) of the second designating or .0005 punch is connected by branch pipe 96 with pressure supply pipe 92, so that when pressure is admitted to the cylinders 89 of the selector, the designating punch will be operated, and, in conjunction therewith, the positioning punch corresponding to the particular selector which is for the time being opposite a notch in the disk. It will thus be seen that the quotient of the proportional divider system, represented by the measured excursion of the quotient element, affects and controls the selection of the appropriate justification signals, and it is obvious that this principle is not restricted in its application to a system such as illustrated wherein double adjustments with different units and a limited number of increments are controlling features.

As incidentals to this proportional divider system, 97 is a spring retracted piston working in a cylinder 98 and provided with a pointed plunger for engaging the V-shaped depressions in bar 59 to effect the final centering of knife edge 58; 99 is a holding pawl for bar 59; 100 is the piston and cylinder for actuating the feeding pawl 62; 101 is a rod attached to piston 102 and provided with pins 103 for engaging the actuating and holding pawls to permit the return of bar 59; 104 is a piston on rod 55 for returning slide 49; 105 is a brake block adapted to bear against and hold slide 49 in adjusted position, said brake-block being connected to a lever 106 (Figs. 3, 8 and 9) pivoted at one end to the plate 43 and having its outer end connected by a link 107 to a lever 108 whose opposite end is connected by a link 109 to the quotient slide 63; 110 is a piston contained within cylinder 111 and provided with a retracting spring 112 and rod 113, the latter pivotally attached to lever 108 near its connection with link 107, so that the thrust of the piston will advance and seat brake block 105 before communicating motion to the quotient slide 63.

After the automatic adjustment of the divisor and dividend elements it would of course be possible to advance the quotient slide by hand, or by operating a suitable valve to admit pressure to cylinder 111, and to thereafter, successively admit pressure to pipes 75 and 92, thus actuating the previously designated or selected punches for the major and minor signals, but it is preferred that these actions should be automatically produced by the depression of a single key corresponding to the resetting key of the prior machine. To this end an automatic control system has been devised for the purpose, but also endowed with additional functions as will presently appear.

Attached to the rear of plate 43 is a valve casing 114 (Figs. 4, 14, 15, 16 and 19) containing a rotary valve 115 constituting what is hereinafter designated as a control means inasmuch as it controls the operation of the punch or punches previously selected or designated by the selecting system. This casing is furnished with three discharge ports of which the first in order, 116, communicates with supply pipe 75 pertaining to the .0075 designating punch and the series of selector pistons 70; the second port, 117, communicates with supply pipe 92 of the .0005 designating punch and the selector cylinders 89; while the third port 118 communicates with the resetting piston 119 (indicated diagrammatically in Fig. 25) by which rock shaft 12 is operated, as in the prior machine. The valve 115 is furnished with a central supply chamber 120 and a single radial discharge port 121 which successively registers with ports 116, 117 and 118 as the valve oscillates. By a single movement of the valve pressure supplied to chamber 120 will be successively admitted to the systems controlled by ports 116, 117 and 118, thereby operating, consecutively, the selected punches of the major and minor justification systems, followed by the return of the line measuring mechanism. To regulate the motion of valve 115 its shaft 122 is provided with a pinion 123 engaged by a rack bar 124, and with an adjustable retracting spring 125. Rack bar 124 is furnished with a motor piston 126 working in cylinder 127 and with a speed governor or piston 128 working in cylinder 129, the latter provided with an inwardly opening check valve 130 and a throttled escape 131 (Fig. 18). The speed governor is designed to prevent too rapid movement of the control means and thus insure individual and consecutive action of the several members or systems controlled thereby. A second valve 132 controls the admission of pressure to motor cylinder 127 through pipe 133, and, incidentally to valve 115 through branch pipe 134; to cylinder 98 through pipe 135 for adjusting and locking bar 59; and to cylinder 111, through pipe 136, for locking the divisor element and advancing the quotient element. The casing 137 of said valve 132 is provided with an exhaust port 138, an inlet port 139 and an intermediate port 140 communicating through pipe 141 with pipe 133. The valve 132 is furnished with a cavity 142 normally establishing communication between exhaust port 138 and port 140, thus relieving the system controlled thereby from pressure.

When moved to operating position the valve closes the exhaust and admits pressure through ports 139 and 140 to the system, thereby actuating the several pistons pertaining thereto. Valve 132 which, inasmuch as it governs the operation of the control means, constitutes the actuator for the system, is responsive to the operations of two mechanisms the one controlled manually through the resetting key and the other automatically through the proportional divider system.

Manual control is effected as follows: Communicating through pipe 143 with the duct leading from the resetting key 11 (Fig. 25) is a cylinder 144 (Figs. 13, 15, 16 and 17) containing a piston 145 carrying a rack bar 146 engaging a gear segment 147 on the shaft 148 of valve 132. When the resetting key is depressed pressure is admitted to cylinder 144 to advance piston 145 against the pressure of a retracting spring 149 and thus initiate the movements of the automatic justification system for producing justification signals in the controller. To prevent the return of valve 132 until after the justification signals have been completed, rack bar 146 is provided with ratchet teeth 150 engaged by a pawl 151 which latter serves to hold the valve in its advanced position until said pawl is withdrawn, which action is preferably performed automatically upon the completion of the return movement of the line rack as will presently appear. But for the interposition of an automatic lock-out, to be described, this manual control of the justification system would permit the operator to terminate the line at any stage of the composition, in which event the justification signals would be erroneous unless such closing of the line occurred within the justification area. This lock-out which prevents the formation of short lines, is represented as a latch or blade 152 (Figs. 3 and 13) attached to a shaft 153 pivotally supported on plate 43 above the rack bar 146. Shaft 153 carries an arm 154 standing between a light spring 155 and an adjustable pin on the rear end of rack bar 44 which engages the dividend element 40. So long as rack bar 44 remains in retracted position it will hold latch 152 against the tension of spring 155 in the path of rack-bar 146 so that the latter cannot be advanced to operate the actuator or valve 132; but immediately rack-bar 44 begins its advance movement, which occurs when the line measuring devices or units rack 5 enters the justification area, the spring will tilt shaft 153 and thereby withdraw latch 152 so that rack-bar 146 is free to advance under the action of the resetting key.

Automatic control of the justification system to prevent overrunning is provided for as follows, its essential elements being a motor device for moving valve 132, and a trip therefor in position to be actuated by the line measuring devices, or a part moving in unison therewith, when said part completes the measurement of the line or, preferably, when it arrives at a point distant from and within the terminal of the line equal to the width of the largest type dealt with. The part selected for indicating the measurement of the line is the dividend element or bar 40. Within the path traversed by said bar is an arm 156 (Figs. 3, 13 and 14) carried by a shaft 157 pivotally supported in bearings on plate 43. The movement of this shaft is communicated through an arm 158 and rod 159 to a spring latch 160, the latter furnished with an engaging shoulder 161 and an inclined surface 162. A plunger 163 backed by a pressure spring 164 is supported in a casing on the rear of plate 43 in line with an arm 165 attached to segment 147 of valve 132. This plunger is held retracted by the engagement of latch 160, but when the latter is withdrawn, as by the action of bar 40 on arm 156, the plunger is advanced to engage arm 165 and thus turn valve 132 to working position. The return motion of the valve under the action of the resetting devices will cause reëngagement of the latch with the plunger. It is desirable that the various parts be so proportioned and arranged that the latch 160 shall release the motor plunger 163 when the arm 40 is within the width, proportionally, of the widest type from the end of the line. If set earlier the capacity of the line will be diminished, and if set later, the line might be overrun by the insertion of a signal for a type whose width exceeds the space remaining in the line.

To prevent the production of character signals by the keys while the automatic devices are operating to set the mechanism preliminary to and after the operation of the justification punches, a lock-out is provided one which will automatically suspend the control of the keys over the punches from the inauguration of the justifying action to the resetting of the mechanism, except during the brief intervals when the justification punches are advancing.

Above the end of a transmitting pin 166 resting upon the rocking frame 4 overlying the punch levers 2, (Figs. 3, 13 and 15) is arranged a latch 167 adapted to be shifted into the path of said pin and thereby prevent its movement and that of the punches. The latch is provided with a toe 168 which is held under the pressure of a spring 169 in engagement with a bar 170 connected to and reciprocating in unison with the arm 165 of valve 132. This bar is furnished with a projection 171 against which the toe of latch 167 bears when the bar 170 is down and the valve 132 is open to the atmosphere. The longitudinal movement of bar 170 incident to the turning of valve 132 withdraws the projection 171 and permits the latch to swing over pin 166, thereby locking out the punches so long as the valve remains open, but immediately the valve is reversed the latch is again withdrawn. This locking out of the punches would interfere with the action of the justification punches were not special provision made for their accommodation. To this end there is provided a device for automatically withdrawing the lock coincident with the production of the justification signals. This includes two cylinders 172 each provided with a piston 173 in position to engage the arm of latch 167 in opposition to its spring. One cylinder 172 is in communication with pressure supply pipe 77 and the other with pipe 96 so that when pressure is admitted to either of said pipes, to actuate the designating punch, piston 173 will operate to withdraw the latch and permit the rocking frame to rise.

It remains to be seen how, after the justification signals have been produced, the parts are restored to initial position preliminary to the composing of another line. This resetting mechanism includes, in part, actuating piston 102 to release the feeding and holding pawls 62 and 99 (Fig. 3) and actuating piston 104, to retract slide 49 of the divisor element. In addition there is provided a piston 176 working in cylinder 177 (Figs. 13, 16 and 17) with its piston rod 178 in position to engage and retract rack bar 146; but before this can be done the holding pawl 151 must be withdrawn, for which purpose piston rod 178 is furnished with a wedge-bar 179 for engaging an arm 180 on said pawl. This wedge bar 179 is set to act upon and withdraw pawl 151 in advance of the engagement of the piston rod with rack bar 146.
It will be remembered that the final operation of the control means or motor actuated valve 115 is to operate the resetting valve of the line measuring system, so as to effect the return of the line measuring devices to initial position. To insure a complete turn of the line measuring devices, as for example the units motor rack 5, the lock-out against the punches is maintained in position until the former has arrived at the limit of its return movement when the punches are automatically released. With this end in view the cylinders of the release pistons 102, 104 and 176 are connected to a common supply pipe 181 (Fig. 25) the latter connected to the eduction port 182 of a justification resetting valve casing 183. This casing is attached to the support for the motor return cylinder 9 (Figs. 22, 23 and 24) and is provided with a pressure supply or inlet port 184, an exhaust port 185 and a valve 186 for alternately connecting ports 182 with 185, and 182 with 184.

Supported in bearings on the line-scale bar 187 and extending longitudinally thereof is a blade 188 provided with an arm 189 connected by a link 190 to valve 186 and upheld by the actuating spring 191 of said valve. Pivotally mounted in the adjustable stop 192 for the line scale rack 193 is a trip lever 194 carrying a pin 195 overlying the free edge of blade 188. The front end of the trip lever 194 is beveled on the underside and projects slightly beyond the face of stop 192 so that it will be engaged and elevated by contact with the end of line scale rack 193 when the latter is fully retracted, in which case blade 188 will be tilted to move valve 186 against the pressure of its spring and thus cause it to establish connection between ports 184 and 182 thereby admitting pressure to supply pipe 181 and actuating the several pistons of the resetting devices. Immediately the line scale rack 193 begins its advance or measuring movement, which occurs when the first signal for a line is produced, valve 186 resumes its normal position, connecting ports 182 and 185 thereby opening the exhaust for the several cylinders. It may here be explained that the justifying space key 174 is in direct communication through pipe 175 with the cylinder 100 of the feeding pawl 62, and that pistons 100, 145 and 173 are of the self venting type employed for actuating the punches, that is, each is furnished with its own exhaust in the form of a spiral circumferential groove 196. The supply ports 139 and 180 of valve casings 137 and 183 may be connected to the pressure chamber 13 of the keyboard or to any other suitable pressure supply.

Operation:—The adjustable line scale stop having been set for the length of line required and the line scale rack brought up against it, all the parts will occupy their retracted positions with the exception of the justification resetting valve and its connection, which latter will be in operating position to admit pressure to the several resetting cylinders. The composition of matter is proceeded with by actuating the finger keys just as in the prior machine and is continued until the justification area is reached, as indicated by the line scale or other appropriate device for the purpose. The formation of the first signal for the new line permits the justification resetting valve and its resetting connections to resume their normal or retracted positions. The production of each justifying space type signal occurring in the line is accompanied by a movement of bar 59, radius bar 51, and a proportional advance of slide 49 carrying the divisor element or double knife edge 41. In the meantime the units motor rack has been advanced, and immediately it enters the justification area it acts through rack bar 44 to effect a proportional advance of the dividend element 40. The operator observing that no further matter can properly be included in the line presses upon the resetting key, thereby reversing the position of the actuator or valve 132 and admitting pressure to valve 115 motor-cylinder 127 and cylinders 98 and 111. The immediate effect of this is to start valve 115 in motion, center and lock bar 44, lock slide 49 and advance the quotient element 42 thereby setting the interponent or punch selecting devices for the major and minor justification signals, and setting the lock out for the punches. As valve 115 advances it first acts to admit pressure to the major justification system, withdrawing the punch-lock, and actuating the designating punch and the measuring punch. It next acts upon the minor justification system in the same way, withdrawing the lock-out, and actuating the designating and measuring punches. Passing to the next port, it actuates the resetting piston of the line measuring mechanism to effect the return of the units motor rack and its connections, and when this movement has been completed, but not before, the resetting valve 186 is actuated, to release and return the members of the proportional divider system and to reverse valve 132, thereby cutting off pressure and permitting return of control valve motor. Should the operator attempt to continue composition beyond the justification area, he will be prevented from so doing by the action of the automatic trip, which, by actuating controller valve 132 will not only set in motion the justification mechanism but prevent the punches from responding to the action of the character keys until the justification signals for the composed line have been completed and the line measuring devices have been restored to initial position.

Although in this illustration air under pressure has been described as the motor and transmitting medium it is obvious that known equivalents may be utilized for carrying out the principles disclosed, and further that the range and unit of the adjustments designated by the proportional divider system can be varied by a proper adjustment and proportioning of the parts and by increasing the number of interponent sections over which the quotient element exercises control.

Attention is called to the fact that in the machine illustrated the elemnet or mechanism denominated the "line measurer" possesses two functions, the one pertaining to the measurement of the type as the line is composed, to indicate the amount of occupied and unoccupied space, and the other relating to the measurement of space occupied within the justification area, whereby the dividend element of the proportional divider is adjusted so as to represent the unoccupied portion of the line or the space to be filled by justification. It is this second function of the line measurer that is availed of in connection with the proportional divider system for effecting automatic justification, the dividend and divisor elements constituting a gage which is set to represent, proportionally, the space remaining to be filled by justification divided by the number of justifying spaces occurring in the line, said gage determining, by its set position, the degree of motion permitted the quotient element and through the latter controlling the selection or designation of the corresponding justification signal.

Having thus described my invention, what I claim as new and desire to secure by Letters Patent, is:—

1. In a typographic composing machine provided with a series of key-controlled signal producing devices and a line measurer, and in combination therewith, an automatic justification-signal selecting system including a proportional divider whose dividend element is controlled by the line measurer, divisor element is independently adjustable, and quotient element determines the selection of the signal producing devices.

2. In a typographic composing machine provided with a series of key-controlled signal producing devices and a line measurer, and in combination therewith a justification signal selecting system including a proportional divider wherein the dividend, divisor and quotient elements are disposed on the lines of a right angle triangle.

3. In a typographic composing machine provided with a series of key controlled signal producing devices and a line measuring mechanism and in combination therewith the following elements, to wit: a pivoted radius bar; a straight edge; an interponent intermediate said straight edge and radius bar and movable on intersecting planes bisecting said straight edge and radius bar respectively; and means for adjusting one of said elements proportionally to the deficiency of the line and for adjusting another of said elements proportionally to the number of interword space type contained in said line.

4. In a proportional divider system for typographic composing machines the combination with the dividend, divisor and quotient elements, of a differential control-mechanism for the divisor element the same comprising a pivoted radius bar, a slide carrying a bearing engaging said radius bar and movable in a plane to one side of the axis thereof, and mechanism for advancing said slide intermittingly through equal spaces corresponding in extent to the interval between the line of motion of said bearing and a line parallel therewith and intersecting the axis of the radius bar.

5. In a proportional divider system for typographic composing machines, as a means for converting progressive movements of uniform degree into differential movements of adjustment, the combination with the divisor element, movable for adjustment in a right line, of a pivoted radius bar intersecting said line of motion at an angle, a bearing or knife edge movable in a right line to one side of and intersecting said radius bar, and intermittently acting actuating devices for advancing said bearing a distance equal to the interval between its plane of motion and a line drawn parallel therewith and intersecting the axis of said radius bar.

6. In a proportional divider system for typographic composing machines the combination with the divisor and a pivoted radius bar for controlling the position of the former, of the knife edge provided with guiding and actuating devices for advancing it intermittently in a line to one side of the center of said radius bar, and means for permitting the initial advance movement or movements of said knife edge without displacement of the radius bar.

7. In a controller composing machine the combination of the following elements, to wit; a series of key controlled punches, including justification designating and positioning punches; a line measurer; a proportional divider system containing dividend, divisor and quotient elements, of which the divisor element is controlled from the justification space key and the dividend element from the line measurer; a punch selecting or designating system controlled by the quotient element; and means for actuating the selected punch in conjunction with a justification designating punch, to produce a justification signal in the controller.

8. In a controller composing machine containing a series of key controlled punches, a justification designating punch, and a line measurer and in combination therewith the following elements, to wit; a proportional divider system whose dividend element is connected to the line measurer, and its divisor element is controlled by the justification space key; a selecting system controlled by the quotient element of the proportional divider, to select or designate a justification positioning punch; and means for actuating the selected positioning punch in conjunction with a justification designating punch.

9. In a controller composing machine provided with a series of key controlled punches including justification positioning and designating punches, and a line measurer, and in combination therewith the following elements, to wit; a proportional divider system whose dividend and divisor elements are set or adjusted by the line measurer and the justification space key, respectively, two selecting systems connected with the quotient element of the proportional divider and each operating in conjunction with the justification positioning punches, to select one of the latter for operation; and means for effecting the consecutive operation of the selected positioning punches.

10. In a controller composing machine the combination of the following elements, to wit; a series of key controlled punches; a plurality of justification designating punches; a line measurer; a proportional divider system whose dividend element receives its adjustment from the line measurer and its divisor element from the justification space key; two punch selecting systems controlled by the quotient element of the proportional divider for designating major and minor degrees of adjustment; and actuating devices for operating the selected punches consecutively each in conjunction with one of the justification designating punches.

11. In a controller composing machine the combination of the following elements, to wit; a proportiona divider system including dividend, divisor and quotient elements, of which the first two, when adjusted to position, limit or measure the motion of the last; a punch selecting system controlled by the movement of the quotient element; and a locking device for fixing the divisor element in adjusted position preliminary to the advance of the quotient element.

12. In a controller composing machine the combination of the following elements, to wit; a proportional divider system including dividend, divisor and quotient elements of which the dividend and divisor when adjusted to position determine the movement of the quotient; a punch selecting system controlled by the movement of said quotient element; a lock for the divisor element; and actuating devices for the quotient element connected to said lock for setting the latter preliminary to the advance of the quotient element.

13. In a controller composing machine the combination of the following elements, to wit; a proportional divider system comprising dividend, divisor and quotient elements; a radius bar for controlling the position of one of said elements; a slide controlling the movements of said radius bar, means for intermittingly advancing said slide; and locking device engaging said slide to position and hold the latter.

14. In a controller composing machine the combination of the following elements, to wit; a series of key controlled punches; a line measurer; a proportional divider system; a punch selecting system controlled by the proportional divider; actuating devices for the selected punch including a control element; and a justification designating punch whose actuating devices are also connected to said control element, to cause both the justification designating and positioning punches to operate in forming the justification signal.

15. In a controller composing machine the combination of the following elements, to wit; a series of key controlled punches; a line measurer; a proportional divider system; a punch selecting system controlled by said proportional divider and including two series of punch selectors; a plurality of justification designating punches; and control means connected to each series of punch selectors and a justification designating punch.

16. In a controller composing machine, the combination of the following elements, to wit; a series of key controlled punches; a line measurer; a proportional divider system; two series of punch selectors controlled by said proportional divider; and an actuating system including control means for devices and connections with the proportional divider, and with each series of punch selectors for actuating the movable element of the proportional divider and the selected punches, successively, in the order named.

17. In a controller composing machine, the combination of the following elements, to wit; a series of key controlled punches comprising two groups; a line measurer responding to the punches of one of said groups; a proportional divider of which one element, dividend, is controlled by the line measurer; a punch selecting system controlled by the quotient element of the proportional divider and including connections controlling the actuating mechanism of one of said groups of key-controlled punches; and a control means for the selected punch.

18. In a controller composing machine the combination of the following elements, to wit; a series of key controlled punches comprising two groups, a plurality of justification designating punches, a line measurer responding to one group of punches; a proportional divider whose dividend element is controlled by the line measurer; a punch selecting system controlled by the quotient element of the proportional divider and including two series of selecting devices each connected to the actuating mechanism of one group of punches; and a control means governing the connections between each series of selecting devices and the actuating mechanism of the justification designating punches.

19. In a controller composing machine, the combination of the following elements, to wit; a series of punches with actuating mechanism therefor; a line measurer; two punch selecting systems; a proportional divider whose dividend element is controlled by the line measurer and whose quotient element controls the two punch selecting systems; means for controlling the actuating devices for the selected punches; and a motor for said controlling means.

20. In a controller composing machine the combination of the following elements, to wit; a series of punches with actuating mechanism therefor; a line measurer; two independent punch selecting systems; a proportional divider whose dividend element is connected to the line measurer and whose quotient element controls the punch selecting systems; devices controlling the punch actuating mechanism through each punch selecting system, successively; a motor for said control means; and an actuator for said motor.

21. In a controller composing machine the combination of the following elements, to wit; a series of punches; a punch selecting system; a punch actuating mechanism provided with a control means and acting through the selecting system upon the punch designated thereby; a motor for said control means and a speed governor for said motor.

22. In a controller composing machine, the combination of the following elements, to wit; a series of key controlled punches; a line measurer; an automatic justification system including a proportional divider, punch selectors, and a punch actuating mechanism provided with a motor; an actuator or starting device for said motor; and a lock-out controlled by the line measurer to release the starting mechanism at a determinate point in the traverse of the line measurer.

23. In a controller composing machine provided with a line measurer, an automatic justification-punch selecting system and devices for actuating the selected punches, and in combination therewith, a lock-out for said actuating devices controlled from the line measurer, to prevent the formation of justification signals before the justification area is entered.

24. In a controller composing machine provided with a line measurer, a series of punches, automatic punch selecting or designating devices and means for actuating the punch or punches selected thereby, and in combination therewith a motor device and a trip therefor controlled from the line measurer, for automatically setting in operation the punch actuating devices at a predetermined point in the traverse of the line measurer.

25. In a controller composing machine provided with a series of punches, a line measurer, an automatic punch selecting or designating mechanism, and means for actuating the punch or punches so selected or designated, and in combination therewith, a lock-out and a motor device controlled by the movements of the line measurer, the lock-out serving to restrain the punch actuating devices for a definite period, and the motor device, to set them in action at a predetermined point in the traverse of the line measurer.

26. In a controller composing mechanism, the combination of the following elements, to wit; a series of key controlled punches with actuating mechanism therefor; an automatic punch selecting or designating mechanism; a punch actuating mechanism operating through the punch selecting mechanism and provided with a starting means or actuator; and a lockout connected to said actuator and operating to automatically suspend the key action.

27. In a controller composing mechanism provided with a series of punches, a series of keys controlling said punches, and a line measurer, and in combination therewith, the following elements, to wit; an automatic punch selecting mechanism connected to the line measurer; devices for operating the selected punch including an actuator, and a lock-out connected to said actuator and operating upon the punches to prevent their action by the keys.

28. In a controller composing mechanism the combination of the following elements; to wit, a series of punches; keys controlling said punches; a line measurer; an automatic dividing and punch selecting mechanism connected to the line measurer; punch operating devices controlled by a starting device or actuator and acting upon the selected punch; a lock-out for the punches; and means controlled by said starting device for setting said lock-out; substantially as described.

29. In a controller composing machine the combination of the following elements, to wit; an automatic punch selector controlled by the line measurer; punch actuating devices including control means and an actuator therefor; a lock-out for said actuator; and a starting device for said actuator including a motor device and trip, the latter controlled by the line measurer.

30. In a controller composing machine, the combination of the following elements, to wit; a series of punches with actuating devices therefor; a punch selecting system including two sets of punch selectors controlling the actuating devices of the punches; a control means adapted to successively actuate the selected punches; an actuator for said control means; a series of keys also controlling the series of punches; a line measurer; a lock-out for the series of punches set by said actuator; and connections intermediate said lock-out and the control means for retracting the former when a selected punch is operated.

31. In a controller composing machine, the combination of the following elements, to wit; a line measurer provided with a resetting mechanism; a proportional divider system; a punch selecting system; punch actuating devices for said selecting system; and a control means for the punch actuating devices connected to and controlling the resetting devices of the line measurer.

32. In a controller composing machine, the combination of the following elements, to wit; a line measurer provided with resetting mechanism; a proportional divider and punch selecting system; punch actuating devices designated by the selecting system; a control means governing said punch actuating devices and the resetting mechanism of the line measurer; an actuator for said control means provided with resetting or retracting devices; and means controlled, mediately, by the line measurer for operating the resetting devices of the actuator, whereby, when the actuator is moved to set in action the control means, to operate the selected punch and return the line measurer, it will retain its open position until the line measurer has been fully retracted and then be shifted to closed position.

33. In a controller composing machine, the combination with automatic punch operating devices, an actuator for establishing and interrupting the power connections, and a line measuring mechanism, of a resetting device engaged by a part connected to the line measuring devices, and operating to retract or return said actuator to normal position when the line measuring devices are reset and as they approach their starting position, corresponding to the beginning of the line.

34. In a controller composing machine, the combination with punch selecting and operating mechanism including an actuator, and a line measuring mechanism, of the following elements, to wit; a lock-out for the punches thrown into active position when the actuator is set to operate the punches automatically; and a resetting device operated by the line measuring mechanism and acting upon the actuator to reset the latter when the line measuring mechanism is restored to position corresponding with the beginning of a line.

35. In a controller composing machine, the combination of the following elements, to wit; a series of key controlled punches; a line measurer; an automatic divider system; a punch selecting system; an actuator for the selected punch; means for setting and retaining said actuator in operating position; a lock-out for the punches connected to the actuator and brought to position when the latter is advanced to operating position; and a resetting device operated by the line measuring mechanism and operating upon the actuator, to release and return the latter when the line measuring devices are returned to initial position at the beginning of a line.

36. In a controller composing machine, the combination of the following elements, to wit; a series of key controlled punches; a line measurer; an automatic divider and punch selecting mechanism; operating devices for the selected punch controlled by a prime actuator; a resetting mechanism for the line measurer also controlled by said actuator; means for setting and locking said actuator in operating position; a lock-out for the punches set by the actuator when advanced to operating position; and a resetting device operated by the line measuring mechanism when returned to initial position at the beginning of the line and operating to unlock and retract the actuator.

37. In a controller composing machine, the combination of the following elements, to wit; a series of punches and actuating pistons; a reciprocating member provided with a gate; means for adjusting the traverse of said member; a series of equally spaced interponents; a cylinder and piston for each interponent, said cylinders connected to a common pressure supply pipe; and a connection between each interponent and a punch cylinder for controlling the admission of pressure therein to actuate the punch.

38. In a controller composing machine the combination of the following elements, to wit; a slide provided with a gate; a stop device for measuring the traverse of said slide; a series of interponents; a series of pistons, one for each interponent; a pressure supply common to the series of pistons; and a discharge port for each piston uncovered by the advance of the latter when its interponent is in register with the gate in said slide.

39. In a controller composing machine, the combination of the following elements, to wit; a movable member provided with a gate; devices for determining the degree of movement of said member; a series of interponents; a piston for each interponent controlling a discharge duct; a pressure supply common to the series of pistons; and a series of actuating pistons each connected to one of said interponent pistons; whereby the selection and operation of said actuating pistons is determined by the registry of the gate with the interponent of the piston corresponding thereto.

40. In a controller composing machine, the combination of the following elements, to wit; a proportional divider; a movable member connected to the quotient element of said proportional divider; a plurality of interponents serially arranged in the line of travel of said movable member and successively released thereby; a series of pistons, one for each interponent, controlling a pressure supply passage; a pressure supply passage common to said pistons, and means for controlling the admission of pressure to said passage.

41. In a controller composing machine the combination of the following elements, to wit; a movable member with means for measuring or adjusting its excursions; a plurality of interponents serially disposed and successively released during the traverse of said movable member; a second movable member; connections for advancing said second movable member at a proportionally higher rate than said first named movable member; a plurality of interponents serially disposed in the line of movement of said second movable member and successively released thereby; a piston for each interponent of the two series controlling an eduction port; a pressure supply conduit or passage common to each series of pistons; and means for controlling the admission of pressure in each of said passages.

42. In a controller composing machine the combination of the following elements, to wit; a series of punch actuating pistons and cylinders; a series of piston valves each having its eduction port connected to one of said punch cylinders; a plurality of interponents, one for each piston valve, serially arranged; a movable member provided with means for successively freeing the interponents as said member is advanced; a pressure supply common to the said piston valves; and means for controlling the pressure in said pressure supply.

43. In a controller composing machine, the combination of the following elements, to wit; a series of punch actuating pistons and cylinders; two series of piston valves, of which one of each series is connected to one of the punch cylinders; a supply pipe for each series of piston valves; a control means or valve for successively admitting pressure to said supply pipes; two series of interponents, one interponent for each piston valve; two movable members each provided with a gate operating in conjunction with one of the series of interponents; and actuating devices for said movable members including a device for measuring or determining the extent of motion and a differential speed mechanism.

44. In a controller composing machine, the combination of the following elements, to wit; a series of punch actuating cylinders; a series of piston valves less in number than the series of punch cylinders and each having its eduction port connected to one of said punch cylinders; a pressure supply pipe common to the cylinders of the piston valves; a connection between said supply pipe and one of the punch cylinders; a series of interponents controlling the piston valves and dominated by a movable member whose traverse is gaged; and means for controlling the admission of pressure to the supply pipe, to actuate two punch pistons, the one direct and the other through the selecting system.

45. In a controller composing machine, the combination of the following elements, to wit; a plurality of punch actuating pistons and cylinders; a series of piston valves less in number than the punch cylinders and each connected to one of the latter; a pressure supply pipe common to the series of piston valves and in open communication with a punch cylinder; a second series of piston valves connected to the punch cylinders and provided with a common supply pipe in open communication with another of the punch cylinders; two series of interponents, one for each series of piston valves; two movable members each dominating one series of interponents; differential speed devices for actuating said movable members; and means for admitting pressure, successively, to the two supply pipes.

46. In a controller composing machine the combination of the following elements, to wit; a plurality of punch actuating cylinders; a line measure provided with a return or resetting mechanism controlled from the pressure cylinder; two series of piston valves connected to the punch cylinders and each provided with a common supply pipe; a proportional divider system; two series of piston valves connected to the punch cylinders and each provided with a common supply pipe; a proportional divider system; two movable members operated at relatively different speeds by the quotient element of the proportional divider; a series of interponents operating in conjunction with each of said members for governing the movements of the piston valves; and a control means or valve for admitting pressure to the supply pipes and the pressure cylinder of the line measurer, successively.

47. In a controller composing machine, the combination of the following elements, to wit; a plurality of punch actuating cylinders; a line measuring mechanism; an automatic proportional divider system connected to the line measurer; a selecting mechanism controlled by the automatic divider and provided with a series of valves each controlling a punch cylinder; a supply pipe for said valves; a resetting cylinder for the line measurer provided with a supply pipe; a control valve for the two supply pipes; and a motor for said control valve.

48. In a controller composing machine, the combination of the following elements, to wit; two punch selecting mechanisms each provided with a pressure supply pipe; a control valve for admitting pressure to said pipes successively; a motor for said control valve; and an actuator valve for said motor.

49. In a controller composing machine, the combination of the following elements, to wit; a proportional divider; a major and a minor selecting mechanism controlled by said divider and each connected to a series of punch actuating cylinders; a pressure supply pipe for each selecting mechanism; a control valve for said supply pipes; a motor for said control valve; an actuator valve for said motor; and a key controlled piston for operating said actuator.

50. In a controller composing machine the combination of the following elements, to wit; a proportional divider; a punch selecting mechanism controlled by said divider; a line measuring mechanism connected to said divider, and provided with a resetting mechanism including an actuating cylinder; a pressure supply pipe for the punch selecting mechanism; a supply pipe for the cylinder of the resetting mechanism; a control valve governing the admission of pressure to said supply pipe; a motor for said control valve; an actuator valve for said motor; a lock for said actuator valve; an unlocking and retracting mechanism for said actuator valve provided with a motor; and a valve actuated by the line measurer controlling said last named motor.

51. In a controller composing machine, the combination of the following elements, to wit; a series of punches provided with actuating pistons and cylinders; a proportional divider system connected to the line measurer and controlling the admission of pressure to the punch cylinders through a selecting mechanism; a pressure supply pipe connected to the punch cylinders through the selecting mechanism; a control valve for said supply pipe; a lock-out for the punches; a cylinder communicating with said supply pipe; and a piston in said cylinder engaging the lock-out to remove the latter.

52. In a controller composing machine the combination of the following elements, to wit; a supply pipe communicating with the punch actuating cylinders through a selecting mechanism; a proportional divider mechanism provided with means for adjusting the dividend and divisor elements thereof, to measure the advance of the quotient element; connections between said quotient element and the selecting mechanism to control the selection of the punch to be operated; a motor for said quotient element provided with a supply pipe; a control valve for the punch actuating supply pipe; a motor for said control valve; and an actuator valve controlling the admission of pressure to said actuator and quotient motors.

53. In a controller composing machine the combination of the following elements, to wit; a line measurer; a proportional divider; a selecting mechanism; a control valve for said selecting mechanism; a motor for the control valve; an actuator valve for the motor; and a motor device and trip mechanism operated by the line measurer to set the actuator valve.

54. In a controller composing machine, the combination of the following elements, to wit; a line measurer; a proportional divider; a selecting mechanism; a resetting mechanism for the line measurer; a control valve for said resetting and selecting mechanisms; a motor for said control valve; an actuator valve for said motor; a lock-out for said actuator valve controlled by the line measurer; and a motor and trip for said actuator also controlled by the line measurer.

55. In a typographic composing machine, the combination with means for producing type signals automatically measuring the deficiency of the line represented by said signals and dividing the same proportionally to the number of justifying space type occurring in the line, to establish a gage for the line, of a movable element limited in its traverse to the ascertained degree, and a signal selecting means controlled by said movable element to designate the signal representing the amount to be added to the justifying space type in order to fill the line.

56. In a typographic composing machine, the combination of the following elements, to wit, means for producing type signals an adjustable gage provided with means for measuring the deficiency of the represented line and dividing the same by the number of justifying spaces occurring in the line; a movable element whose traverse is determined by said gage; and a signal selecting system controlled by said movable element to designate a signal corresponding to the ascertained deficiency in width of the spaces contained in the line.

57. In a typographic composing machine provided with means for automatically selecting the justification signals appropriate to a line of composition, and in combination therewith, manually controlled means for producing the justification signals after the composed line has reached the justification area but not otherwise, to prevent the production of unjustified short lines.

58. In a typographic machine provided with means for automatically selecting or designating justification signals appropriate to the line of composition and in combination therewith, manually controlled means for producing the justification signals so designated at any time after the composed line has entered the justification area, but not otherwise, and automatic means for producing said signals at the conclusion of the line of composition, to prevent long lines.

59. In a typographic machine provided with manually controlled means for producing type signals, an automatic justification signal selecting or designating means, manually controlled justification signal producing means operative within the justification area, and an automatic justification signal producing means operative at the conclusion of the line, and in combination therewith, means for suspending the action of the type signal producing devices pending the formation of the justification signals, to prevent the formation of type signals while the designated justification signals are being produced.

60. In a controller composing machine provided with a series of punches and means for automatically measuring and dividing the deficiency of the composed line, the combination therewith of means automatically controlled by said measuring and dividing devices and operating to select from among the series of punches the one most nearly corresponding in value to the indicated product.

61. In a controller composing machine provided with a plurality of justification designating punches, a series of measuring punches and means for automatically measuring and dividing the deficiency of the composed line and in combination therewith means for automatically selecting the justification designating punches and means controlled by said measuring and dividing devices for selecting the appropriate measuring punches.

62. In a controller composing machine provided with means for designating major and minor justification signals, means for designating justification measuring signals, and means for automatically measuring and dividing the deficiency of a composed line, the combination therewith of means for automatically selecting the appropriate measuring signals to accompany the major and minor designating signals.

63. In a controller composing machine the combination of the following elements, to wit, means for designating major and minor justification; means for designating degrees of adjustment; means for automatically measuring and dividing the deficiency of a composed line; and means controlled by said measuring and dividing devices for selecting the adjustment designation appropriate to the major and minor designations, respectively.

64. The combination with a keyboard perforating mechanism, of means controlled thereby for rendering the keys inoperative when perforations representing a predetermined space value have been recorded.

65. The combination with a perforating mechanism provided with appliances for registering the aggregate space value of successive perforations, of lock-out means for preventing the formation of perforations in excess of the predetermined measure.

66. The combination with a perforating mechanism provided with a paper feed, character designating keys, devices for registering the aggregate space value of character perforations and a lockout for suspending the production of character perforations after a determinate space-value has been registered.

67. A keyboard perforating machine provided with means for automatically arresting or throwing out of action the character punches upon the completion of a series of perforations of predetermined space value.

68. In a perforating machine such as described the combination of a cut out for the character punches and an automatic actuating device for the justification punches.

69. In a composing machine such as described, the combination with means for producing type signals and means for measuring the space value of said signals, of a proportional divider system or mechanism for automatically gaging the amount to be added to each justification space in order to justify or fill out the line.

70. In a record-strip composing machine such as described, the combination with means for producing type signals, and means for measuring the space value of said signals, of a proportional divider system or mechanism for automatically measuring the deficiency of each justification space type, and justification signal, selecting means controlled by said proportional divider system or mechanism for designating the appropriate signal producing devices.

71. In a record strip composing machine such as described, the combination with means for producing type signals and means for measuring the space value of said signals, of a proportional divider system or mechanism controlled by said measuring means, a justification signal selecting means controlled by said proportional divider system, and means for producing the selected justification signal.

72. In a record strip composing machine such as described, the combination with means for producing type signals, and means for measuring the space value of said signals, of a proportional divider system or mechanism, and a plurality of justification signal selecting and producing means whose selective elements are gaged by the proportional divider system or mechanism.

73. In a record strip composing machine the combination with means for producing consecutive type signals and measuring the space value thereof, of a proportional divider system or mechanism controlled by the line measuring devices and operating to gage the deficiency of the justification spaces, a plurality of justification signal selecting and producing means controlled by the proportional divider system or mechanism and means for effecting consecutive action of said justification signal producing devices.

74. In a composing machine such as described, the combination of the following elements, to wit; means for producing type signals; means for measuring the space value of said type signals; means for producing a plurality of sets of justification signals, each set including a designating and a measuring element; a proportional divider system or mechanism controlled by the space measuring means and operating to gage the deficiency of the line in fractions corresponding with the number of justifying space type contained in the line; and selecting means controlled by said proportional divider system or mechanism for designating the individual signals of the justification signal producing devices.

75. In a composing machine the combination with character and space signal producing devices and means for measuring the line of a proportional divider system or mechanism coöperating with the line measuring means to gage the deficiency of the line.

76. In a composing machine provided with type and space signal producing means and a line measuring mechanism and in combination therewith a proportional divider system whose divisor element is controlled by the space signal designating devices, its dividend element by the line measuring devices and whose quotient element gages the deficiency of each justification space contained in the line.

77. In a composing machine provided with type and space signal devices and a line measuring mechanism and in combination therewith a justification signal selecting system and a proportional divider system whose divisor and dividend elements are controlled by the space signal and line measuring devices respectively and whose quotient element gages the deficiency of each justification type in the line and controls the justification signal selecting system.

78. The combination with a record strip composing machine provided with signal producing and line measuring means, of an automatic justification signal selecting mechanism including a proportional divider system for measuring or gaging the deficiency of the justification spaces represented by the signals for a line.

79. The combination with a record strip composing machine of an automatic justification signal selecting mechanism including a proportional divider system for gaging the deficiency of the justification spaces and a justification signal selecting system controlled by the quotient or gaging element of said proportional divider system.

80. The combination with a record strip composing machine of an automatic justification signal selecting mechanism including a proportional divider system, a justification signal selecting system and a translating system for converting the measured space deficiency into units of the justification system and selecting the signal devices corresponding thereto.

81. In a controller composing machine and in combination with the signal selecting and producing devices thereof, a proportional divider mechanism or system adapted to gage the deficiency of the indicated spaces and control the signal selecting devices.

82. The combination with a record strip composing machine of an automatic proportional divider system for measuring or gaging the amount to be added to each space in order to justify the line, a justification signal selecting system and translating devices intermediate said proportional divider and justification signal selecting systems for converting the measure of the space deficiency into units of the justification signal selecting system.

83. The combination with a record strip composing machine of an automatic proportional divider system for measuring or gaging the amount to be added to each space type to justify the line, a justification signal selecting system including major and minor justification signal selecting devices, and translating devices intermediate said proportional divider and justification signal selecting systems for converting the measure of space deficiency into units of the major and minor justification systems.

84. In a typographic composing machine the combination with character selecting, line measuring and resetting or restoring devices, of means for locking the resetting devices out of action until the justification area has been reached by the line measuring devices, to prevent short lines.

85. The combination with a record strip composing machine provided with resetting or restoring mechanism for the line measuring devices, of a short line preventer controlling the action of the resetting mechanism and controlled by the line measuring mechanism to render the resetting mechanism operative when the line measure reaches the justification area.

86. The combination with a record strip composing machine provided with resetting mechanism for the line measuring devices of automatic long and short line preventers.

87. In a record strip composing machine, the combination with a line measuring mechanism provided with a movable abutment or gaging member, of a proportional divider system for measuring the deficiency of the line provided with a gaging member and means for advancing the latter to measure the interval between the two gaging members.

88. The combination with the line measuring mechanism provided with a movable gaging member for measuring the deficiency of the line, an opposing gaging member, an automatic justification signal selecting mechanism coupled with said last named gaging member and motor devices for advancing said second named gaging member.

89. In a composing machine the combination of the following elements, to wit; a record strip composing mechanism; a line gaging member; a proportional divider provided with a space gaging member; and a justification signal selecting system controlled by said space gaging member.

90. In a record strip composing machine such as described, the combination of the following elements, to wit; a justification signal selecting mechanism provided with a justification designating device, a plurality of justification dimensioning devices serially arranged and a movable selective device for the dimensioning devices; a proportional divider mechanism operating to gage the deficiency of the spaces and shift the dimension selective device proportionally; and means for actuating the designating and selective dimensioning devices.

91. In a record strip composing machine such as described, the combination with a proportional divider mechanism for gaging the deficiency of the spaces and a movable dimensioning punch selector, of a translating device or mechanism for converting the measure of space deficiency into units of the dimensioning punches.

92. In an automatic justification signal selecting system for record strip composing machines and in combination therewith, the following elements, to wit; a starting device or mechanism for the automatic system; a lockout therefor; and means controlled by the line gaging mechanism for actuating said lockout to release the starting devices when the line measure enters the justification area.

93. In a record strip composing machine such as described, the combination with the justification signal selecting mechanism of the following elements, to wit; a starting device for the justification system; a lock-out for preventing the action of said starting device; and means for actuating said lock out to release the starting device including a motor device coupled with the line measuring mechanism and brought into action by the latter as it approaches the justification area.

94. In a record strip composing machine such as described, the combination with an automatic justification signal selecting mechanism and the starting device therefor of the following elements, to wit; a lock-out engaging said starting device, and a motor device controlled by the line measuring devices for releasing said lock-out when the line measuring devices reach a predetermined position.

95. In a record strip composing machine provided with justification signal selecting devices and a starting device therefor, the combination of the following elements, to wit; a lock-out for the starting device; actuating devices for said lock-out including a motor and a pick-up; and means controlled by the line measuring mechanism for energizing said motor just before the line measuring devices enter the justification area.

96. In a record strip composing machine provided with justification signal selecting mechanism, the combination of the following elements, to wit; a starting device; a lock-out provided with actuating devices controlled by the line measuring mechanism to release the starting device after a predetermined portion of the line has been measured; and means for varying the action of said actuating devices to change the time of release relatively to the advance of the line measuring devices.

97. A record strip composing machine provided with an automatic justification signal selecting mechanism including a series of punch bars and two punch selecting mechanisms each provided with means for coupling selected punches with the actuator and in combination therewith a consecutive controller mechanism provided with automatic means for successively coupling the two punch selecting mechanisms with the punch bars and actuator.

98. In a record strip composing machine provided with a series of punches and means for selectively actuating the members thereof, and in combination therewith, two punch selecting members or mechanisms, each controlling a plurality of said punches and acting to bring them serially into operative relation with power actuating means; two special punches; and means for dissimultaneously effecting the operation of the two selected punches in conjunction with one of said special punches.

99. In a composing machine such as described, the combination with a series of punches, actuating devices therefor, and a movable member controlling said actuating devices to selectively bring them into action, of a motor for shifting said movable member, and means for gaging the degree of motion imparted to said member and the serial value of the punch brought into action.

JOSEPH B. CHURCH.

Witnesses:
MELVILLE CHURCH,
ALEXANDER S. STEUART.